(12) United States Patent
Dinakar et al.

(10) Patent No.: US 12,157,497 B2
(45) Date of Patent: Dec. 3, 2024

(54) VEHICLE SYSTEMS AND RELATED METHODS WITH AUTONOMOUS COURTESY AVOIDANCE

(71) Applicant: GM GLOBAL TECHNOLOGY OPERATIONS LLC, Detroit, MI (US)

(72) Inventors: Jeffrey Pradeep Dinakar, Novi, MI (US); Andrew Wassef, Novi, MI (US); Tessa Benjamin, Milford, MI (US); Steven J Vance, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 301 days.

(21) Appl. No.: 17/810,489

(22) Filed: Jul. 1, 2022

(65) Prior Publication Data
US 2024/0001963 A1   Jan. 4, 2024

(51) Int. Cl.
*B60W 60/00* (2020.01)
(52) U.S. Cl.
CPC ..... *B60W 60/0015* (2020.02); *B60W 2552/10* (2020.02); *B60W 2556/45* (2020.02)
(58) Field of Classification Search
CPC ......... B60W 60/0015; B60W 2556/45; B60W 2552/10
See application file for complete search history.

(56) References Cited

U.S. PATENT DOCUMENTS

| | | | |
|---|---|---|---|
| 2020/0292338 A1* | 9/2020 | Fowe | G08G 1/0141 |
| 2021/0109539 A1 | 4/2021 | Kobilarov | |
| 2022/0081005 A1* | 3/2022 | Brown | G08G 1/162 |
| 2023/0041498 A1* | 2/2023 | Weston | B60W 60/0025 |
| 2023/0368675 A1* | 11/2023 | Gardner | G08G 1/0145 |
| 2023/0417565 A1* | 12/2023 | Saxena | B60W 50/0097 |

* cited by examiner

*Primary Examiner* — Behrang Badii
*Assistant Examiner* — Jay Khandpur
(74) *Attorney, Agent, or Firm* — Lorenz & Kopf LLP

(57) ABSTRACT

Vehicles and related systems and methods are provided for controlling a vehicle in an autonomous operating mode. One method involves identifying a stationary object outside a current lane of travel based at least in part on sensor data captured onboard the vehicle, determining an estimated location for the stationary object based at least in part on the sensor data and a location of the vehicle and providing the estimated location to a remote system. The remote system updates lane preference information corresponding to the estimated location for the stationary object when the stationary object satisfies one or more avoidance criteria. The method continues by determining a trajectory for a vehicle to change lanes based at least in part on the updated lane preference information and autonomously operating one or more actuators onboard the vehicle in accordance with the trajectory.

20 Claims, 6 Drawing Sheets

VEHICLE SYSTEMS AND RELATED METHODS WITH AUTONOMOUS COURTESY AVOIDANCE

INTRODUCTION

The technical field generally relates to vehicle systems and more particularly relates to autonomous operation of a vehicle to mimic driving behavior of human operators when encountering a stationary object.

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Due to the sheer number of different variables in a real-world environment, an autonomous vehicle control system could encounter an environment or scenario where assistance may be desired. For example, in lower-level automation systems (e.g., Level Three or below), traffic, road conditions and other obstacles or scenarios can be encountered that may require a driver or other vehicle occupant could manually control or operate the vehicle in some instances, which introduces a burden that is somewhat contrary to the intent of the automation. At the same time, automation behavior may deviate from human behavior in a manner that is not intuitive to a driver, which may consequently result in unnecessary manual intervention that is not required and impair the user experience. Accordingly, it is desirable to provide vehicle control systems and methods that are capable of autonomously responding to certain scenarios in a manner that more closely mimics human driving behavior to improve user experience. Other desirable features and characteristics of the present invention will become apparent from the subsequent detailed description and the appended claims, taken in conjunction with the accompanying drawings and the foregoing technical field and background.

SUMMARY

Apparatus for a vehicle, computer-readable media and related methods for controlling the vehicle in an autonomous operating mode are provided. In one implementation, at least one non-transitory computer-readable medium is provided that has stored thereon executable instructions that, when executed by at least one processor, cause the at least one processor to identify an object outside a first lane of travel based at least in part on one or more sets of sensor data captured by one or more sensing devices onboard one or more vehicles, identify an estimated location of the object based at least in part on the one or more sets of sensor data and one or more locations of the one or more vehicles, determine whether one or more avoidance criteria associated with the object are satisfied, update a lane preference associated with at least a portion of the first lane of travel corresponding to the estimated location for the object when the one or more avoidance criteria are satisfied, resulting in an updated lane preference associated with the at least the portion of the first lane of travel, and provide the updated lane preference associated with the at least the portion of the first lane of travel to a vehicle over a network, wherein one or more actuators onboard the vehicle are autonomously operated to change lanes based at least in part on the updated lane preference.

In one aspect, the one or more avoidance criteria include a minimum threshold number of observations and the executable instructions cause the at least one processor to determine whether a number of observations of the object by the one or more vehicles is greater than or equal to the minimum threshold number of observations and update the lane preference after determining the number of observations is greater than or equal to the minimum threshold number of observations. In a further aspect, the one or more avoidance criteria include an observation window of time for the minimum threshold number of observations, and the executable instructions cause the at least one processor to determine whether the number of observations of the object by the one or more vehicles is greater than or equal to the minimum threshold number of observations within the observation window of time and update the lane preference after determining the number of observations within the observation window of time is greater than or equal to the minimum threshold number of observations. In a further implementation, the executable instructions cause the at least one processor to determine the observation window of time based at least in part on the estimated location of the object.

In another aspect, the executable instructions cause the at least one processor to determine the minimum threshold number of observations based at least in part on the estimated location of the object. In yet another implementation, the executable instructions cause the at least one processor to identify an object type associated with the object and determine the one or more avoidance criteria based at least in part on the object type. In another implementation, the executable instructions cause the at least one processor to identify an object type associated with the object and determine a distance for the portion of the first lane of travel based at least in part on the object type. In another implementation, the executable instructions cause the at least one processor to update the lane preference by designating the portion of the first lane of travel corresponding to the estimated location for the object as a non-preferred lane and designating the portion of a second lane of travel corresponding to the estimated location for the object as a preferred lane. In another aspect, the executable instructions cause the at least one processor to determine whether a monitoring period of time has elapsed since a most recent observation of the object after updating the lane preference and in response to an absence of a recurring observation within the monitoring period of time, reverting the lane preference associated with the at least the portion of the first lane of travel from the updated lane preference to an original lane preference associated with the portion of the first lane of travel.

A method of controlling a vehicle in an autonomous operating mode is also provided that involves identifying, by a controller associated with the vehicle, an object outside a current lane of travel based at least in part on sensor data from one or more sensing devices onboard the vehicle, determining, by the controller, an estimated location for the object based at least in part on the sensor data and a location of the vehicle, providing, by the controller, the estimated location for the object to a remote system, wherein the remote system is configured to update a lane preference associated with at least a portion of the current lane of travel corresponding to the estimated location for the object when the object satisfies one or more avoidance criteria, resulting in an updated lane preference associated with the at least the portion of the current lane of travel, determining, by the controller, a trajectory for the vehicle to change lanes based at least in part on the updated lane preference, and autonomously operating, by the controller, one or more actuators onboard the vehicle in accordance with the trajectory.

In one aspect, the method further involves determining, by the controller, an object type associated with the object based at least in part on the sensor data, and providing, by the controller, the object type for the object to the remote system, wherein the remote system is configured to update the lane preference associated with at least the portion of the current lane of travel in a manner that is influenced by the object type. In another aspect, the remote system is configured to update the lane preference when a number of observations associated with the object is greater than a threshold. In one implementation, at least one non-transitory computer-readable medium includes executable instructions that, when executed by at least one processor, cause the at least one processor to perform the method.

A vehicle system is also provided that includes one or more vehicles coupled to a network to obtain lane preference information for a road, wherein the one or more vehicles include a sensor to provide sensor data for an object external to the respective vehicle, a navigation system to provide location data for the respective vehicle contemporaneous to the sensor data, a memory comprising computer readable instructions, and a processing device for executing the computer readable instructions, the computer readable instructions controlling the processing device to perform operations including determining an estimated location for the object based at least in part on the sensor data and the location data for the respective vehicle and providing the estimated location for the object, wherein the lane preference information associated with at least a portion of the road corresponding to the estimated location for the is updated object when the object satisfies one or more avoidance criteria, resulting in updated lane preference information associated with the at least the portion of the road, determining a trajectory for the respective vehicle based at least in part on the updated lane preference information, and autonomously operating one or more actuators onboard the respective vehicle in accordance with the trajectory.

In one aspect, the one or more avoidance criteria include a minimum threshold number of observations, and a remote server is configured to determine whether a number of observations of the object by the one or more vehicles is greater than or equal to the minimum threshold number of observations and update the lane preference information after determining the number of observations is greater than or equal to the minimum threshold number of observations. In a further aspect, the one or more avoidance criteria include an observation window of time for the minimum threshold number of observations wherein a remote server is configured to determine whether the number of observations of the object by the one or more vehicles is greater than or equal to the minimum threshold number of observations within the observation window of time and update the lane preference information after determining the number of observations within the observation window of time is greater than or equal to the minimum threshold number of observations. In one or more implementations, a remote server is configured to determine the observation window of time based at least in part on the estimated location of the object. In another aspect, a remote server is configured to determine the minimum threshold number of observations based at least in part on the estimated location of the object. In one aspect, a remote server is configured to update the lane preference information by designating the portion corresponding to the estimated location for the object of a first lane of the road nearest to the object as a non-preferred lane and designating the portion of a second lane of the road corresponding to the estimated location for the object as a preferred lane. In another aspect, a remote server is configured to determine whether a monitoring period of time has elapsed since a most recent observation of the object after updating the lane preference information and automatically reverting the lane preference information in response to an absence of a recurring observation within the monitoring period of time.

BRIEF DESCRIPTION OF THE DRAWINGS

The exemplary aspects will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
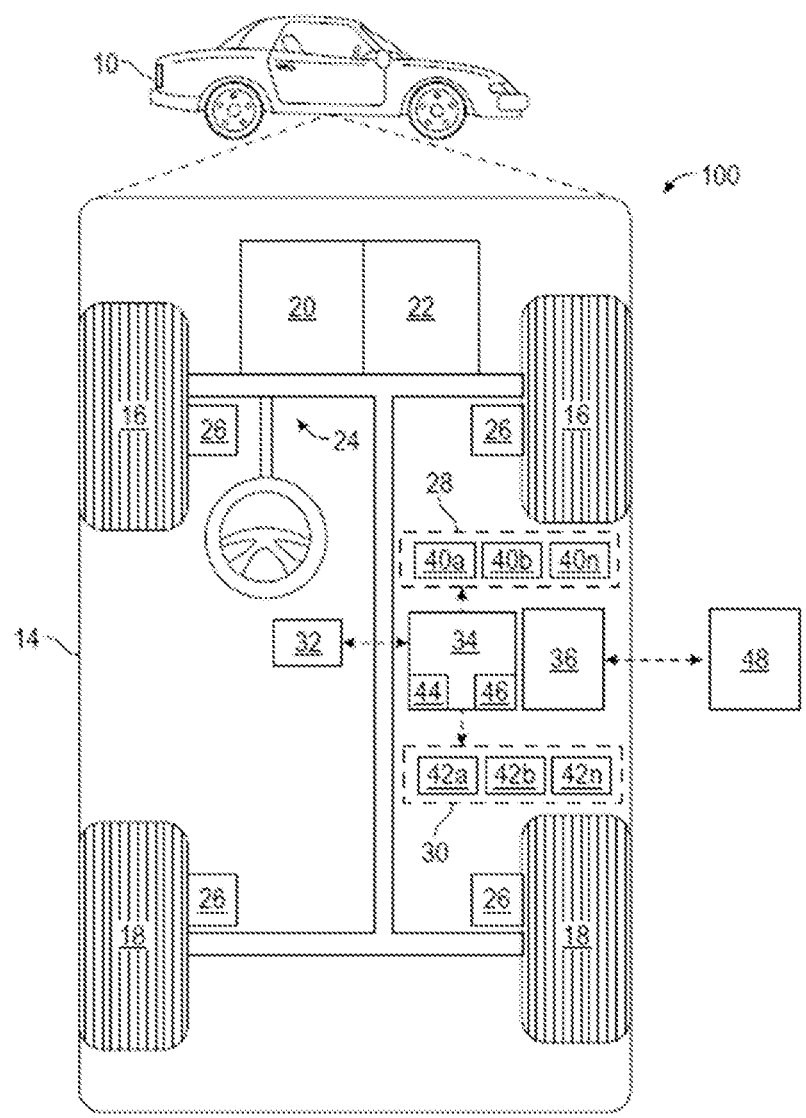
FIG. 1 is a block diagram illustrating an autonomous vehicle control system for a vehicle in accordance with various implementations.

Referring now to FIG. 1, in accordance with one or more implementations, an autonomous vehicle control system shown 100 determines a plan for autonomously operating a vehicle 10 along a route in a manner that accounts for objects or obstacles detected by onboard sensors 28, 40, as described in greater detail below. In this regard, a control module onboard the vehicle 10 calibrates different types of onboard sensors 28, 40 with respect to one another and/or the vehicle 10, thereby allowing data from those different types of onboard sensors 28, 40 to be spatially associated or otherwise with one another based on the calibration for purposes of object detection, object classification, and the resulting autonomous operation of the vehicle 10.

As depicted in FIG. 1, the vehicle 10 generally includes a chassis, a body 14, and front and rear wheels 16, 18 rotationally coupled to the chassis near a respective corner of the body 14. The body 14 is arranged on the chassis and substantially encloses components of the vehicle 10, and the body 14 and the chassis may jointly form a frame.

In exemplary implementations, the vehicle 10 is an autonomous vehicle or is otherwise configured to support one or more autonomous operating modes, and the control system 100 is incorporated into the vehicle 10 (hereinafter referred to as the vehicle 10). The vehicle 10 is depicted in the illustrated implementation as a passenger car, but it should be appreciated that any other vehicle including motorcycles, trucks, sport utility vehicles (SUVs), recreational vehicles (RVs), marine vessels, aircraft, etc., can also be used. In an exemplary implementation, the vehicle 10 is a so-called Level Two automation system. A Level Two system indicates "partial driving automation," referring to the driving mode-specific performance by an automated driving system to control steering, acceleration and braking in specific scenarios while a driver remains alert and actively supervises the automated driving system at all times and is capable of providing driver support to control primary driving tasks.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various implementations, include an internal combustion engine, an electric machine such as a traction motor, and/or a fuel cell propulsion system. The transmission system 22 is configured to transmit power from the propulsion system 20 to the vehicle wheels 16, 18 according to selectable speed ratios. According to various implementations, the transmission system 22 may include a step-ratio automatic transmission, a continuously-variable transmission, or other appropriate transmission. The brake system 26 is configured to provide braking torque to the vehicle wheels 16, 18. The brake system 26 may, in various implementations, include friction brakes, brake by wire, a regenerative braking system such as an electric machine, and/or other appropriate braking systems. The steering system 24 influences a position of the of the vehicle wheels 16, 18. While depicted as including a steering wheel for illustrative purposes, in some implementations contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various implementations, the vehicle features can further include interior and/or exterior vehicle features such as, but are not limited to, doors, a trunk, and cabin features such as air, music, lighting, etc. (not numbered).

The data storage device 32 stores data for use in automatically controlling the vehicle 10. In various implementations, the data storage device 32 stores defined maps of the navigable environment. In various implementations, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various implementations, one or more instructions of the controller 34 are embodied in the control system 100 (e.g., in data storage element 46) and, when executed by the processor 44, cause the processor 44 to obtain data captured or generated from imaging and ranging devices 40 and utilize the captured environmental data to determine commands for autonomously operating the vehicle 10, as described in greater detail below. In one or more exemplary implementations, the data storage element 46 maintains a lookup table of lateral planning information that may be utilized to determine corresponding lateral reference trajectories for maneuvering laterally into an adjacent lane, with the lateral planning information and resulting reference lateral trajectory being utilized or otherwise referenced by the processor 44 to determine commands for autonomously operating the vehicle 10 when the normal vehicle guidance or control scheme supported by the processor 44 encounters a deadline or other temporal constraint for a time-sensitive lateral maneuver to avoid having to solve for a commanded vehicle path within a limited period of time.

Still referring to FIG. 1, in exemplary implementations, the communication system 36 is configured to wirelessly communicate information to and from other entities 48 over a communication network, such as but not limited to, other vehicles ("V2V" communication) infrastructure ("V2I" communication), remote systems, and/or personal devices. In an exemplary implementation, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The communication network utilized by the communication system 36 can include a wireless carrier system such as a cellular telephone system that includes a plurality of cell towers (not shown), one or more mobile switching centers (MSCs) (not shown), as well as any other networking components required to connect the wireless carrier system with a land communications system, and the wireless carrier system can implement any suitable communications technology, including for example, digital technologies such as CDMA (e.g., CDMA2000), LTE (e.g., 4G LTE or 5G LTE), GSM/GPRS, or other current or emerging wireless technologies. Additionally, or alternatively, a second wireless carrier system in the form of a satellite communication system can be utilized to provide uni-directional or bi-directional communication using one or more communication satellites (not shown) and an uplink transmitting station (not shown), including, but not limited to satellite radio services, satellite telephony services and/or the like. Some implementations may utilize a land communication system, such as a conventional land-based telecommunications network including a public switched telephone network (PSTN) used to provide hardwired telephony, packet-switched data communications, and the Internet infrastructure. One or more segments of a land communication system can be implemented through the use of a standard wired network, a fiber or other optical network, a cable network, power lines, other wireless networks such as wireless local area networks (WLANs), or networks providing broadband wireless access (BWA), or any combination thereof.

Figure 2:
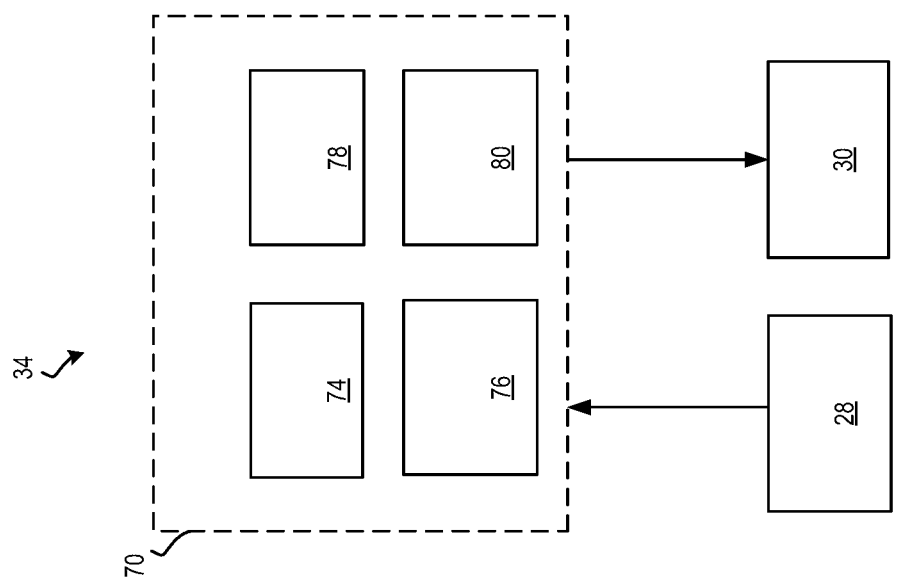
FIG. 2 is a block diagram of an automated driving system (ADS) suitable for implementation by the autonomous vehicle control system of the vehicle of FIG. 1 in accordance with various implementations.

Referring now to FIG. 2, in accordance with various implementations, controller 34 implements an autonomous driving system (ADS) 70. That is, suitable software and/or hardware components of controller 34 (e.g., processor 44 and computer-readable storage device 46) are utilized to provide an autonomous driving system 70 that is used in conjunction with vehicle 10, for example, to automatically control various actuators 30 and thereby control vehicle acceleration, steering, and braking, respectively, without human intervention.

In various implementations, the instructions of the autonomous driving system 70 may be organized by function or system. For example, as shown in FIG. 2, the autonomous driving system 70 can include a sensor fusion system 74, a positioning system 76, a guidance system 78, and a vehicle control system 80. As can be appreciated, in various implementations, the instructions may be organized into any number of systems (e.g., combined, further partitioned, etc.) as the disclosure is not limited to the present examples.

In various implementations, the sensor fusion system 74 synthesizes and processes sensor data and predicts the presence, location, classification, and/or path of objects and features of the environment of the vehicle 10. In various implementations, the sensor fusion system 74 can incorporate information from multiple sensors, including but not limited to cameras, lidars, radars, and/or any number of other types of sensors. In one or more exemplary implementations described herein, the sensor fusion system 74 correlates image data to lidar point cloud data, the vehicle reference frame, or some other reference coordinate frame using calibrated conversion parameter values associated with the pairing of the respective camera and reference frame to relate lidar points to pixel locations, assign depths to the image data, identify objects in one or more of the image data and the lidar data, or otherwise synthesize associated image data and lidar data. In other words, the sensor output from the sensor fusion system 74 provided to the vehicle control system 80 (e.g., indicia of detected objects and/or their locations relative to the vehicle 10) reflects or is otherwise influenced by the calibrations and associations between camera images, lidar point cloud data, and the like.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow given the current sensor data and vehicle pose. The vehicle control system 80 then generates control signals for controlling the vehicle 10 according to the determined path. In various implementations, the controller 34 implements machine learning techniques to assist the functionality of the controller 34, such as feature detection/classification, obstruction mitigation, route traversal, mapping, sensor integration, ground-truth determination, and the like.

In one or more implementations, the guidance system 78 includes a motion planning module that generates a motion plan for controlling the vehicle as it traverses along a route. The motion planning module includes a longitudinal solver module that generates a longitudinal motion plan output for controlling the movement of the vehicle along the route in the general direction of travel, for example, by causing the vehicle to accelerate or decelerate at one or more locations in the future along the route to maintain a desired speed or velocity. The motion planning module also includes a lateral solver module that generates a lateral motion plan output for controlling the lateral movement of the vehicle along the route to alter the general direction of travel, for example, by steering the vehicle at one or more locations in the future along the route (e.g., to maintain the vehicle centered within a lane, change lanes, etc.). The longitudinal and lateral plan outputs correspond to the commanded (or planned) path output provided to the vehicle control system 80 for controlling the vehicle actuators 30 to achieve movement of the vehicle 10 along the route that corresponds to the longitudinal and lateral plans.

During normal operation, the longitudinal solver module attempts to optimize the vehicle speed (or velocity) in the direction of travel, the vehicle acceleration in the direction of travel, and the derivative of the vehicle acceleration in the direction of travel, alternatively referred to herein as the longitudinal jerk of the vehicle, and the lateral solver module attempts to optimize one or more of the steering angle, the rate of change of the steering angle, and the acceleration or second derivative of the steering angle, alternatively referred to herein as the lateral jerk of the vehicle. In this regard, the steering angle can be related to the curvature of the path or route, and any one of the steering angle, the rate of change of the steering angle, and the acceleration or second derivative of the steering angle can be optimized by the lateral solver module, either individually or in combination.

In an exemplary implementation, the longitudinal solver module receives or otherwise obtains the current or instantaneous pose of the vehicle, which includes the current position or location of the vehicle, the current orientation of the vehicle, the current speed or velocity of the vehicle, and the current acceleration of the vehicle. Using the current position or location of the vehicle, the longitudinal solver module also retrieves or otherwise obtains route information which includes information about the route the vehicle is traveling along given the current pose and plus some additional buffer distance or time period (e.g., 12 seconds into the future), such as, for example, the current and future road grade or pitch, the current and future road curvature, current and future lane information (e.g., lane types, boundaries, and other constraints or restrictions), as well as other constraints or restrictions associated with the roadway (e.g., minimum and maximum speed limits, height or weight restrictions, and the like). The route information may be obtained from, for example, an onboard data storage element 32, an online database, or other entity. In one or more implementations, the lateral route information may include the planned lateral path command output by the lateral solver module, where the longitudinal and lateral solver modules iteratively derive an optimal travel plan along the route.

The longitudinal solver module also receives or otherwise obtains the current obstacle data relevant to the route and current pose of the vehicle, which may include, for example, the location or position, size, orientation or heading, speed, acceleration, and other characteristics of objects or obstacles in a vicinity of the vehicle or the future route. The longitudinal solver module also receives or otherwise obtains longitudinal vehicle constraint data which characterizes or otherwise defines the kinematic or physical capabilities of the vehicle for longitudinal movement, such as, for example, the maximum acceleration and the maximum longitudinal jerk, the maximum deceleration, and the like. The longitudinal vehicle constraint data may be specific to each particular vehicle and may be obtained from an onboard data storage element 32 or from a networked database or other entity 48, 52, 54. In some implementations, the longitudinal vehicle constraint data 416 may be calculated or otherwise determined dynamically or substantially in real-time based on the current mass of the vehicle, the current amount of fuel onboard the vehicle, historical or recent performance of the vehicle, and/or potentially other factors. In one or more implementations, the longitudinal vehicle constraint data is calculated or determined in relation to the lateral path, the lateral vehicle constraint data, and/or determinations made by the lateral solver module. For example, the maximum longitudinal speed may be constrained at a particular location by the path curvature and the maximum lateral acceleration by calculating the maximum longitudinal speed as a function of the path curvature and the maximum lateral acceleration (which itself could be constrained by rider preferences or vehicle dynamics). In this regard, at locations where the degree of path curvature is relatively high (e.g., sharp turns), the maximum longitudinal speed may be limited accordingly to maintain comfortable or achievable lateral acceleration along the curve.

Using the various inputs to the longitudinal solver module, the longitudinal solver module calculates or otherwise determines a longitudinal plan (e.g., planned speed, acceleration and jerk values in the future as a function of time) for traveling along the route within some prediction horizon (e.g., 12 seconds) by optimizing some longitudinal cost variable or combination thereof (e.g., minimizing travel time, minimizing fuel consumption, minimizing jerk, or the like) by varying the speed or velocity of the vehicle from the current pose in a manner that ensures the vehicle complies with longitudinal ride preference information to the extent possible while also complying with lane boundaries or other route constraints and avoiding collisions with objects or obstacles. In this regard, in many conditions, the resulting longitudinal plan generated by the longitudinal solver module does not violate the maximum vehicle speed, the maximum vehicle acceleration, the maximum deceleration, and the maximum longitudinal jerk settings associated with the user, while also adhering to the following distances or buffers associated with the user. That said, in some scenarios, violating one or more longitudinal ride preference settings may be necessary to avoid collisions, comply with traffic signals, or the like, in which case, the longitudinal solver module may attempt to maintain compliance of as many of the user-specific longitudinal ride preference settings as possible. Thus, the resulting longitudinal plan generally complies with the user's longitudinal ride preference information but does not necessarily do so strictly.

In a similar manner, the lateral solver module receives or otherwise obtains the current vehicle pose and the relevant route information and obstacle data for determining a lateral travel plan solution within the prediction horizon. The lateral solver module also receives or otherwise obtains lateral vehicle constraint data which characterizes or otherwise defines the kinematic or physical capabilities of the vehicle for lateral movement, such as, for example, the maximum steering angle or range of steering angles, the minimum turning radius, the maximum rate of change for the steering angle, and the like. The lateral vehicle constraint data may also be specific to each particular vehicle and may be obtained from an onboard data storage element 32 or from a networked database or other entity 48, 52, 54. The lateral solver module may also receive or otherwise obtain user-specific lateral ride preference information which includes, for example, user-specific values or settings for the steering rate (e.g., a maximum rate of change for the steering angle, a maximum acceleration of the steering angle, and/or the like), the lateral jerk, and the like. The lateral ride preference information may also include user-specific distances or buffers, such as, for example, a minimum and/or maximum distance from lane boundaries, a minimum lateral buffer or lateral separation distance between objects or obstacles, and the like, and potentially other user-specific lane preferences (e.g., a preferred lane of travel).

Using the various inputs to the lateral solver module, the lateral solver module calculates or otherwise determines a lateral plan for traveling along the route at future locations within some prediction horizon (e.g., 50 meters) by optimizing some lateral cost variable or combination thereof (e.g., minimizing deviation from the center of the roadway, minimizing the curvature of the path, minimizing lateral jerk, or the like) by varying the steering angle or vehicle wheel angle in a manner that ensures the vehicle complies with the lateral ride preference information to the extent possible while also complying with lane boundaries or other route constraints and avoiding collisions with objects or obstacles.

During normal operation, the lateral solver module may utilize the longitudinal travel plan from the longitudinal solver module along with the route information and obstacle data to determine how to steer the vehicle from the current pose within the prediction horizon while attempting to comply with the lateral ride preference information. In this regard, the resulting longitudinal and lateral travel plans that are ultimately output by the motion planning module comply with as many of the user's ride preferences as possible while optimizing the cost variable and avoiding collisions by varying one or more of the vehicle's velocity, acceleration/deceleration (longitudinally and/or laterally), jerk (longitudinally and/or laterally), steering angle, and steering angle rate of change. The longitudinal travel plan output by the motion planning module includes a sequence of planned velocity and acceleration commands with respect to time for operating the vehicle within the longitudinal prediction horizon (e.g., a velocity plan for the next 12 seconds), and similarly, the lateral travel plan output by the motion planning module includes a sequence of planned steering angles and steering rates with respect to distance or position for steering the vehicle within the lateral prediction horizon while operating in accordance with the longitudinal travel plan (e.g., a steering plan for the next 50 meters). The longitudinal and lateral plan outputs are provided to the vehicle control system 80, which may utilize vehicle localization information and employs its own control schemes to generate control outputs that regulate the vehicle localization information to the longitudinal and lateral plans by varying velocity and steering commands provided to the actuators 30, thereby varying the speed and steering of the vehicle 10 to emulate or otherwise effectuate the longitudinal and lateral plans.

As described in greater detail below, in exemplary implementations, the guidance system 78 supports a hands-free autonomous operating mode that controls steering, acceleration and braking while it is enabled and operating to provide lane centering while attempting to maintain a driver-selected speed and/or following distance (or gap time) relative to other vehicles using the current sensor data (or obstacle data) provided by the sensor fusion system 74 and the current vehicle pose provided by the positioning system 76. For purposes of explanation, the autonomous operating mode that controls steering, acceleration and braking to provide lane centering while attempting to maintain a driver-selected speed and/or following distance may alternatively be referred to herein as an autonomous cruise control mode or an autonomous lane centering control mode. In the autonomous cruise control mode, the guidance system 78 may autonomously initiate lane changes based on traffic, road conditions or other obstacles. In exemplary implementations described herein, the autonomous cruise control mode supported by the guidance system 78 is capable of autonomously initiating lane changes to increase a buffer distance with respect to a stationary object outside of the current lane of travel (e.g., on the shoulder, in an adjacent lane, or the like) based on lane preference information associated with a region in a vicinity of the stationary object received from a remote system (e.g., entity 48). In this manner, the autonomous cruise control mode mimics courtesy or caution employed by a human driver in an automated and autonomous manner, thereby providing an intuitive user experience that reduces the likelihood of unnecessary manual intervention.

Figure 3:
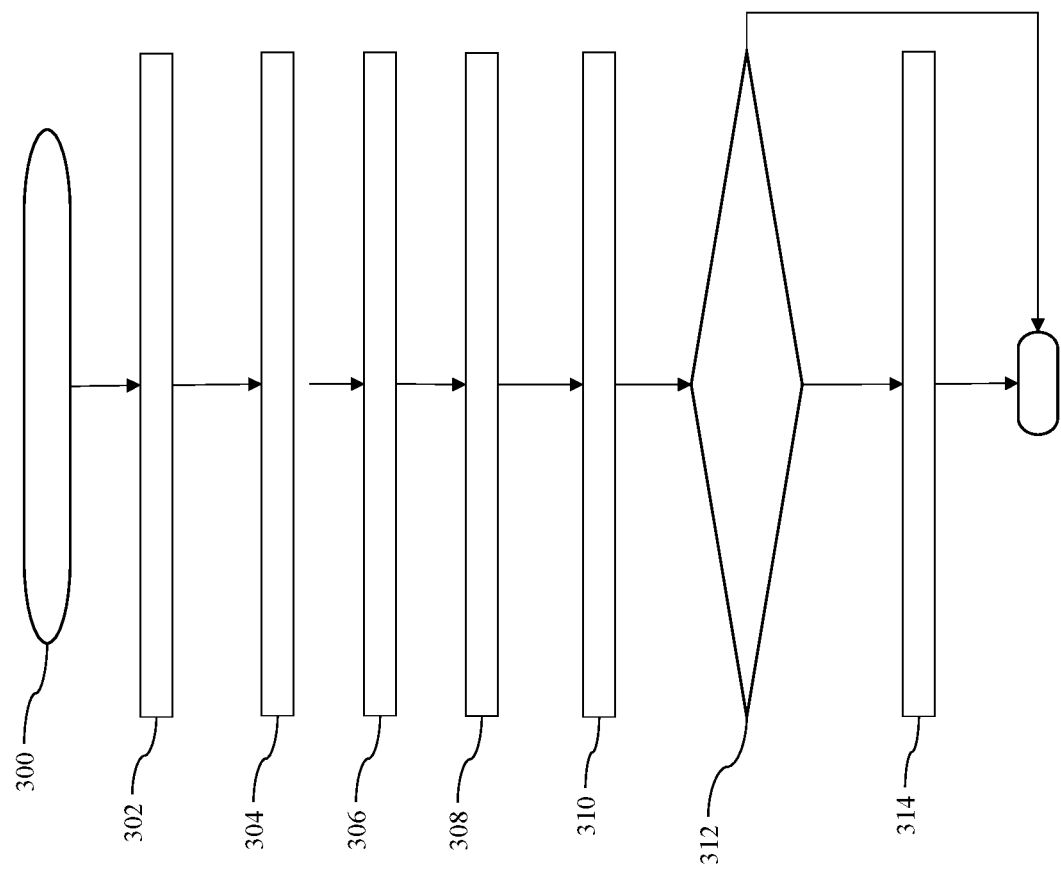
FIG. 3 depicts a flow diagram of a courtesy avoidance process suitable for implementation by the ADS of FIG. 2 in the autonomous vehicle control system of FIG. 1 according to one or more aspects described herein.

FIG. 3 depicts an exemplary implementation of a courtesy avoidance process 300 suitable for implementation by a control module onboard a vehicle (e.g., by the guidance system 78 of the ADS 70 supported by the controller 34 in the vehicle 10) to cause the vehicle to capture and upload data pertaining to stationary objects detected by a camera, image sensor or other sensing device onboard the vehicle (e.g., sensing device 40) and automatically initiate a lane change to increase the buffer distance between the host vehicle and a detected object. For illustrative purposes, the following description may refer to elements mentioned above in connection with FIGS. 1-2. While portions of the courtesy avoidance process 300 may be performed by different elements of a vehicle system, for purposes of explanation, the subject matter may be primarily described herein in the context of the courtesy avoidance process 300 being primarily performed by the ADS 70 implemented by the controller 34 associated with the vehicle 10. In one or more exemplary aspects, the courtesy avoidance process 300 is performed in connection with the object monitoring process 400 described in greater detail below in the context of FIG. 4.

In the illustrated implementation, the courtesy avoidance process 300 initializes or otherwise begins by detecting or otherwise identifying presence of a stationary object in a vicinity of the current lane of travel at 302. In response to identifying the stationary object, the courtesy avoidance process 300 calculates or otherwise determines an estimated location of the stationary object at 304, classifies or otherwise assigns an object type or other classifications to the stationary object at 306, and then transmits or otherwise uploads the stationary object data to a remote system for analysis at 308. As described in greater detail below in the context of the object monitoring process 400 of FIG. 4, the remote system utilizes the stationary object data to dynamically update lane preference information associated with the location of the stationary object.

Still referring to FIG. 3, in an exemplary implementation, the sensor fusion system 74 analyzes the sensor data obtained from the sensing devices 40 associated with the vehicle 10 to detect or otherwise identify a set or sequence of sensor data samples that correspond to the presence of an object in the vicinity of the vehicle and store or otherwise maintain the sensor data samples in association with the time (or timestamps) associated with when the respective sensor data samples were obtained and location information associated with the contemporaneous or current location of the vehicle at the time the respective sensor data samples were obtained. Vehicle location data samples obtained from GPS or other onboard vehicle navigation system may be provided by the positioning system 76 and utilized by the sensor fusion system 74 to calculate or otherwise determine an estimated location of the detected object using the sensor data, for example, based on the distance between the detected object and the host vehicle determined using lidar or radar at a particular orientation relative to the host vehicle. In this regard, the sensor fusion system 74 and/or the ADS 70 may identify or otherwise determine that the detected object is stationary based on the estimated location of the detected object being maintained substantially the same across subsequent sampling times (or time slices of object sensor data).

The sensor fusion system 74 analyzes the detected object sensor data set to identify or otherwise determine whether at least one sample of the sensor data set for the detected object can be classified, labeled or otherwise assigned a particular object type with a desired level of confidence, for example, by using a classification model for detecting that object type. In his regard, the sensor data samples may be input or otherwise provided to one or more classification models to assign a particular object type to the detected object, such as, for example, an emergency vehicle and/or a particular type thereof (e.g., a police car, an ambulance, a fire truck, etc.), a passenger vehicle and/or a particular type thereof (e.g., a sedan, a truck, an SUV, a motorcycle, etc.), a heavy-duty vehicle and/or a particular type thereof (e.g., a bus, a freight truck, etc.), and/or the like. Thereafter, the sensor fusion system 74 and/or the ADS 70 uploads or otherwise transmits the set of stationary object data to a remote system (e.g., entity 48) that includes the estimated location of the stationary object, the object type or classification assigned to the stationary object and the time at which the stationary object was detected or observed.

At 310, the illustrated courtesy avoidance process 300 receives or otherwise obtains lane preference information associated with the current location of the host vehicle from the remote system. When the courtesy avoidance process 300 determines the lane preference information associated with the current location of the host vehicle is indicative of a lane change associated with the stationary object at 312, the courtesy avoidance process 300 utilizes the lane preference information to automatically initiate an autonomous lane change from the current lane of travel to another lane of travel that provides an increased buffer distance between the host vehicle and the stationary object at 314.

For example, in exemplary implementations, the autonomous cruise control mode supported by the guidance system 78 may be configured to periodically obtain, from the remote system, mapping information for the current route of travel as the vehicle travels to ensure that the guidance system 78 and the motion planning module associated therewith it utilizing the most up-to-date and/or substantially real-time data pertaining to the roadway conditions and operating environment, where the mapping information includes lane preferences or priority designations for different segments of the route. As described in greater detail below in the context of FIG. 4, the remote server may temporarily modify and dynamically update the lane preference information associated with a stationary object to designate the lane of travel nearest to the stationary object as non-preferred or lowest priority relative to the other lanes of travel, thereby causing the autonomous cruise control mode supported by the guidance system 78 to attempt to autonomously initiate a lane change from the lane of travel nearest the stationary object to a different preferred or higher priority lane. Thus, in response to detecting a stationary object while currently traveling in a non-preferred lane of travel adjacent to or nearest the stationary object, the autonomous cruise control mode supported by the guidance system 78 may automatically attempt to initiate a lane change from the current lane of travel (alternatively referred to as the original lane of travel) to a higher priority or more preferred lane while approaching and passing the stationary object.

By autonomously and automatically changing lanes to move the host vehicle to another lane of travel that is further from the stationary object, the courtesy avoidance process 300 increases the buffer distance between the host vehicle and the stationary object when the host vehicle passes the stationary object, and thereby mimics cautious or courteous driving behavior that is likely to be performed by a human driver encountering the stationary object. In this manner, the autonomous cruise control mode responds to an emergency vehicle or other vehicle that may be stopped in an adjacent lane or on the shoulder that would not otherwise require a lane change or other action. Thereafter, once the vehicle has passed the stationary object and the lane preference information associated with the updated location of the vehicle no longer indicates that the original lane of travel is a non-preferred or lowest priority lane (or the original lane now has a greater preference or higher priority than the current lane of travel), the autonomous cruise control mode supported by the guidance system 78 may automatically attempt to initiate a lane change to return the vehicle to the original lane of travel prior to encountering the stationary object. In some implementations, when the guidance system 78 is unable to initiate a lane change (e.g., due to traffic in an adjacent lane), the autonomous cruise control mode supported by the guidance system 78 may automatically reduce the speed of the vehicle from the currently set speed for the vehicle while traveling in a non-preferred lane of travel adjacent to or nearest the stationary object and maintain the reduced speed until the vehicle has passed the stationary object and the lane preference information associated with the updated location of the vehicle no longer indicates that the current lane of travel is a non-preferred or lowest priority lane.

Figure 4:
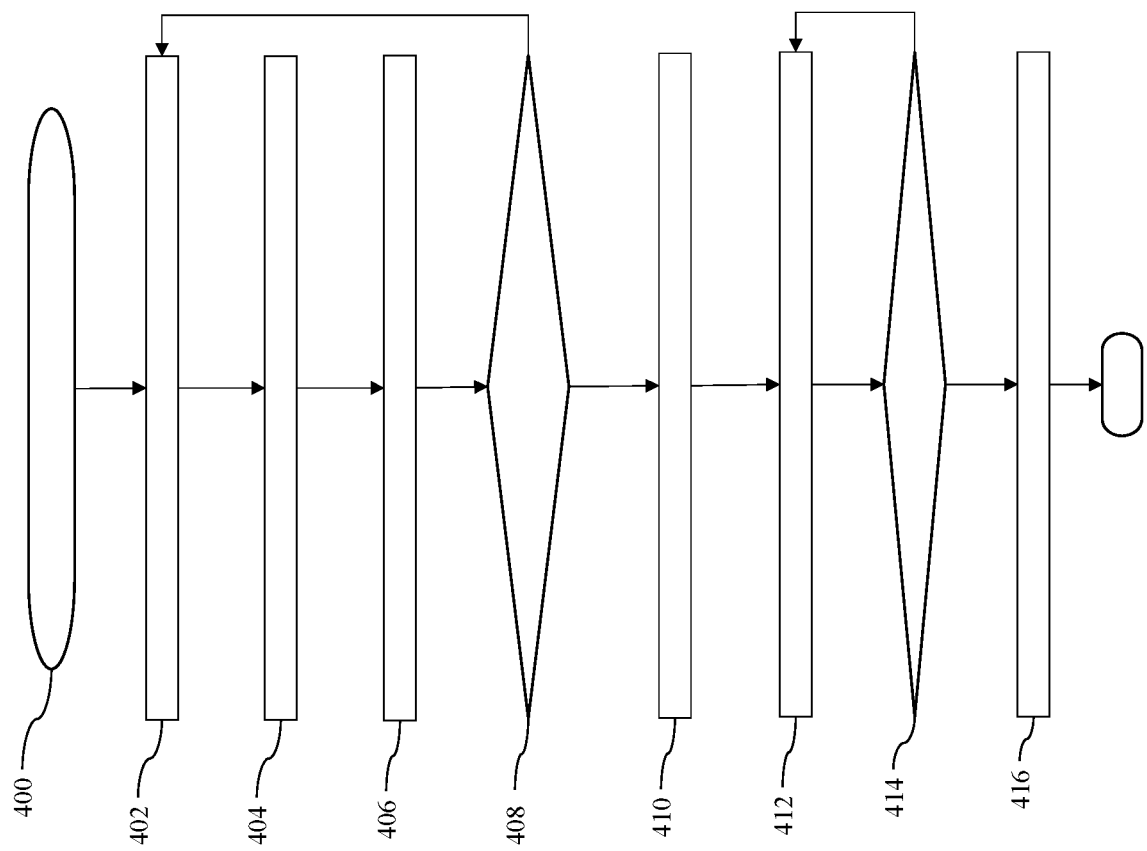
FIG. 4 depicts a flow diagram of an object monitoring process suitable for implementation by an entity in the autonomous vehicle control system of the vehicle of FIG. 1 in connection with the courtesy avoidance process of FIG. 3 according to one or more aspects described herein.

FIG. 4 depicts an exemplary implementation of an object monitoring process 400 suitable for implementation by a remote system in connection with the courtesy avoidance process 300 to dynamically update lane preference information to account for transient stationary objects detected by traveling vehicles. The remote system generally represents a central server, a remote server or any other sort of remote processing system (e.g., entity 48) capable of communicating with multiple different instances of the vehicle 10 over a network (e.g., global networks (e.g., the Internet), metropolitan area networks (MANs), wide area networks (WANs), local area networks (LANs), personal area networks (PANs), vehicle-to-infrastructure (V2I) networks, vehicle-to-vehicle (V2V) networks, vehicle-to-pedestrian (V2P) networks, vehicle-to-grid (V2G) networks, or the like). In this regard, the remote system generally includes processing system, which could be realized using any sort of processor, controller, central processing unit, graphics processing unit, microprocessor, microcontroller and/or a combination thereof that is suitably configured to support the object monitoring process 400 and the subject matter described herein. The remote system may also include or otherwise be coupled to a database or other a data storage, which could be realized as any sort of memory (e.g., a random-access memory, a read-only memory, etc.), data store (e.g., a solid state drive, a hard disk drive, mass storage, etc.) or the like that is coupled to the processing system and configured to support the subject matter described herein. In one implementation, the data storage associated with the remote system is realized as non-transitory short or long term data storage or other computer-readable media that stores code or other computer-executable programming instructions that, when executed by the processing system of the remote system, are configurable to cause the processing system to create, generate, or otherwise facilitate one or more services that are configurable to support the object monitoring process 400 and the subject matter described herein.

In the illustrated implementation depicted in FIG. 4, the object monitoring process 400 begins by receiving or otherwise obtaining stationary object data from any number of different vehicles at 402 and associates different sets of stationary object data from different vehicles with corresponding stationary objects at 404. In this regard, the remote system (e.g., entity 48) receives, from different instances of vehicle 10, sets of stationary object data (e.g., at 308 of the courtesy avoidance process 300 of FIG. 3) that include an estimated location of a detected stationary object, a type or classification assigned to the detected stationary object and the time at which the stationary object was detected or observed. Based on the relationships between the estimated location, the object type or classification, and the time of detection, the remote system may associated different sets of stationary object data from different vehicles with a common stationary object that the respective data is attributable to, that is, a common stationary object having the same object type or classification that was likely to have been observed at substantially the same location by each of the different vehicles. For example, the remote system may create one or more tables in a database for tracking different stationary objects that were independently observed by different vehicles.

At 406, the object monitoring process 400 retrieves or otherwise obtains avoidance criteria to be applied for a given stationary object and then analyzes the avoidance criteria with respect to the stationary object data sets associated with that stationary object to determine whether one or more avoidance criteria are satisfied with respect to that stationary object at 408. In this regard, the database or other data storage associated with the remote system may store or otherwise maintain one or more avoidance criteria or other logic that may be utilized to determine whether a particular stationary object should be precautionarily avoided. In one or more implementations, the avoidance criteria include a minimum threshold number of times that the stationary object must have been observed by different vehicles and a threshold period of time (or time window) during which that minimum number of observations must occur in order to trigger precautionary avoidance of the stationary object (e.g., at least three different observations by at least three different vehicles within a thirty minute window). In this regard, the avoidance criteria may be configurable to ensure a desired level of confidence about the location or presence of the stationary object, a desired level of confidence about what the stationary object is likely to be and/or a desired level of confidence about the timeframe during which the stationary object is likely to be present before any response to the stationary object is triggered.

Depending on the implementation, the avoidance criteria may vary depending on the estimated location of the stationary object, the object type or classification of the stationary object, and/or the time of day during which the stationary object was observed. For example, for a stationary object observed in a more remote geographic location on or along a route with limited traffic volume, the avoidance criteria may include a lower minimum threshold number of observations and/or a longer observation window of time during which those observations can occur to account for the likelihood of more infrequent observation of the object due to lower traffic on that route. On the other hand, for a stationary object observed in an urban or less remote geographic location on or along a route with higher traffic volume, the avoidance criteria may include a higher minimum threshold number of observations and/or a shorter observation window of time during which those observations can occur to account for the likelihood of more frequent observation of the object and reduce the likelihood of false positives (or unnecessary avoidance actions).

At 410, when the avoidance criteria are satisfied with respect to a particular stationary object, the object monitoring process 400 automatically updates the lane preference information associated with a road or route for a region in a vicinity of the estimated location of that stationary object to provide a precautionary buffer with respect to that object. For example, based on the estimated location of the stationary object, the remote system may automatically tag, mark or otherwise designate an adjacent lane of travel closest to the stationary object as a non-preferred or lowest priority lane for at least a portion or segment of that road or route that precedes a vehicle encountering that stationary object. Depending on the implementation, the distance or length of the portion of the road for which the adjacent lane is designated as non-preferred or deprioritized in advance of the stationary object may be fixed or vary depending on the speed limit or other criteria associated with that portion of the road. For example, a longer portion of a highway or freeway having a higher speed limit associated therewith may be designated as non-preferred or low priority to account for higher vehicle speeds reducing the amount of time required to traverse the distance-to-go before encountering the stationary object. On the other hand, a shorter portion of a residential street or other surface street having a lower speed limit associated therewith may be designated as non-preferred or low priority to account for slower vehicle speeds and reduce the likelihood of a non-intuitive lane change too far in advance of encountering the stationary object (which could incur manual intervention). In this regard, the database or other data storage associated with the remote system may store or otherwise maintain one or more criteria or other logic that may be utilized to determine the distance or length of road to be designated as non-preferred or lowest priority as a function of the speed limit associated with the road and potentially other factors associated with the stationary object (e.g., the estimated location of the stationary object, the object type or classification of the stationary object, and/or the time of day during which the stationary object was observed).

As described above in the context of the courtesy avoidance process 300 of FIG. 3, after the object monitoring process 400 dynamically updates the lane preference information to account for a detected stationary object satisfying the relevant avoidance criteria within the subset of mapping information pertaining to the region encompassing the estimated location of that stationary object, different instances of vehicles 10 subsequently traveling along that same road or route through the region in the vicinity of the stationary object may retrieve the mapping information for that region (e.g., at 310) and utilize the updated lane preference information to automatically and autonomously initiate a lane change (e.g., at 312) to avoid traveling in the lane of travel adjacent to the stationary object that was previously-observed by preceding instances of vehicles 10 traversing that same road or route. In this manner, the object monitoring process 400 updating the lane preference information at 410 operates to provide a precautionary buffer between the detected stationary object and other vehicles 10 subsequently traveling past that location along the same road or route in the future.

Still referring to FIG. 4, in exemplary implementations, the object monitoring process 400 determines the amount of time that has elapsed since the most recent observation of a particular stationary object at 412 and detects when the amount of elapsed time since the most recent observation is greater than a threshold period of time at 414 before reverting the lane preferences back to their original state at 416. In this regard, the remote system analyzes subsequently received stationary object data sets from vehicles (e.g., at 402) to identify any recurring observations associated with a stationary object for which the avoidance criteria were previously satisfied at 408. In some implementations, after updating the lane preferences at 410, the remote system initiates a timer or similar feature to monitor the amount of time that has elapsed since the most recent observation of a particular object. In other implementations, the remote system may calculate or otherwise determine the amount of elapsed time using the timestamp associated with the most recent observation of the object (e.g., based on the time difference relative to the current time). In a similar manner as described above in the context of the observation window associated with the avoidance criteria, the monitoring period of time (or time window) during which a subsequent recurring observation must occur may be fixed or vary depending on contextual factors. For example, a stationary object previously observed in a geographic location on or along a route with higher traffic volume and/or at a particular time of day with higher traffic volume, the recurrence monitoring window of time during which another observation would be expected to occur may be shorter to account for the likelihood of more frequent observation of the object due to higher traffic on that route, while for an stationary object observed on or along a route with lower traffic volume and/or at a particular time of day with lower traffic volume, the recurrence monitoring window of time during which another observation would be expected to occur may be longer to avoid prematurely reverting the lane preferences while the stationary object may still be present by accounting for the likelihood of more infrequent observation of the object along that route and/or at that particular time of day.

When a previously-detected object for which precautionary avoidance was initiated (e.g., at 408 and 410) has not been observed within the threshold monitoring period of time (e.g., zero observations within the last three hours), the remote system automatically reverts the lane preference information associated with the road or route in the vicinity of the estimated location of that stationary object to the original lane preference configuration to eliminate the precautionary buffer with respect to that object based on the likelihood that that object is no longer present at the previously-observed location. For example, the remote system may automatically tag, mark or otherwise designate the adjacent lane of travel that was closest to the stationary object as a preferred lane of travel or otherwise assign a higher priority that was previously associated with that lane for the portion or segment of that road or route that was previously deprioritized or marked as non-preferred. In this manner, the remote system implementing the object monitoring process 400 dynamically updates the lane preference information to account for the absence of a previously-detected stationary object to reduce the likelihood of non-intuitive lane changes for different instances of vehicles 10 subsequently traveling along that same road or route in the future. As described above, different instances of vehicles 10 subsequently traveling along that road or route will retrieve the mapping information for that region (e.g., at 310) and utilize the restored lane preference information to forego a lane change once the stationary object that was previously-observed by preceding instances of vehicles 10 traversing that same road or route is no longer present.

Figure 5:
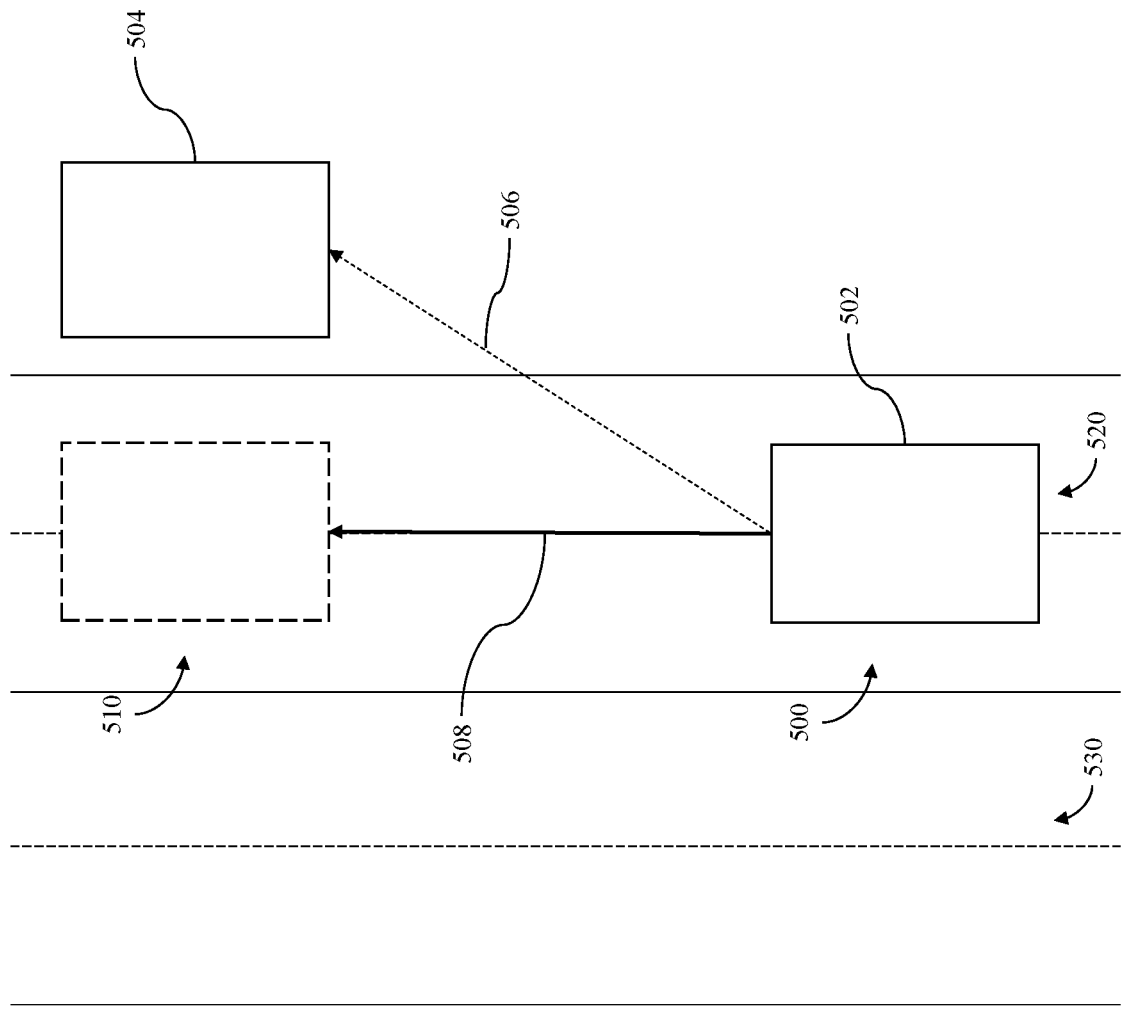
FIGS. 5-6 depict exemplary scenarios of vehicles encountering a stationary object along a common route for an example implementation of the courtesy avoidance process of FIG. 3 in connection with the object monitoring process of FIG. 4 according to one or more aspects described herein.
Figure 6:
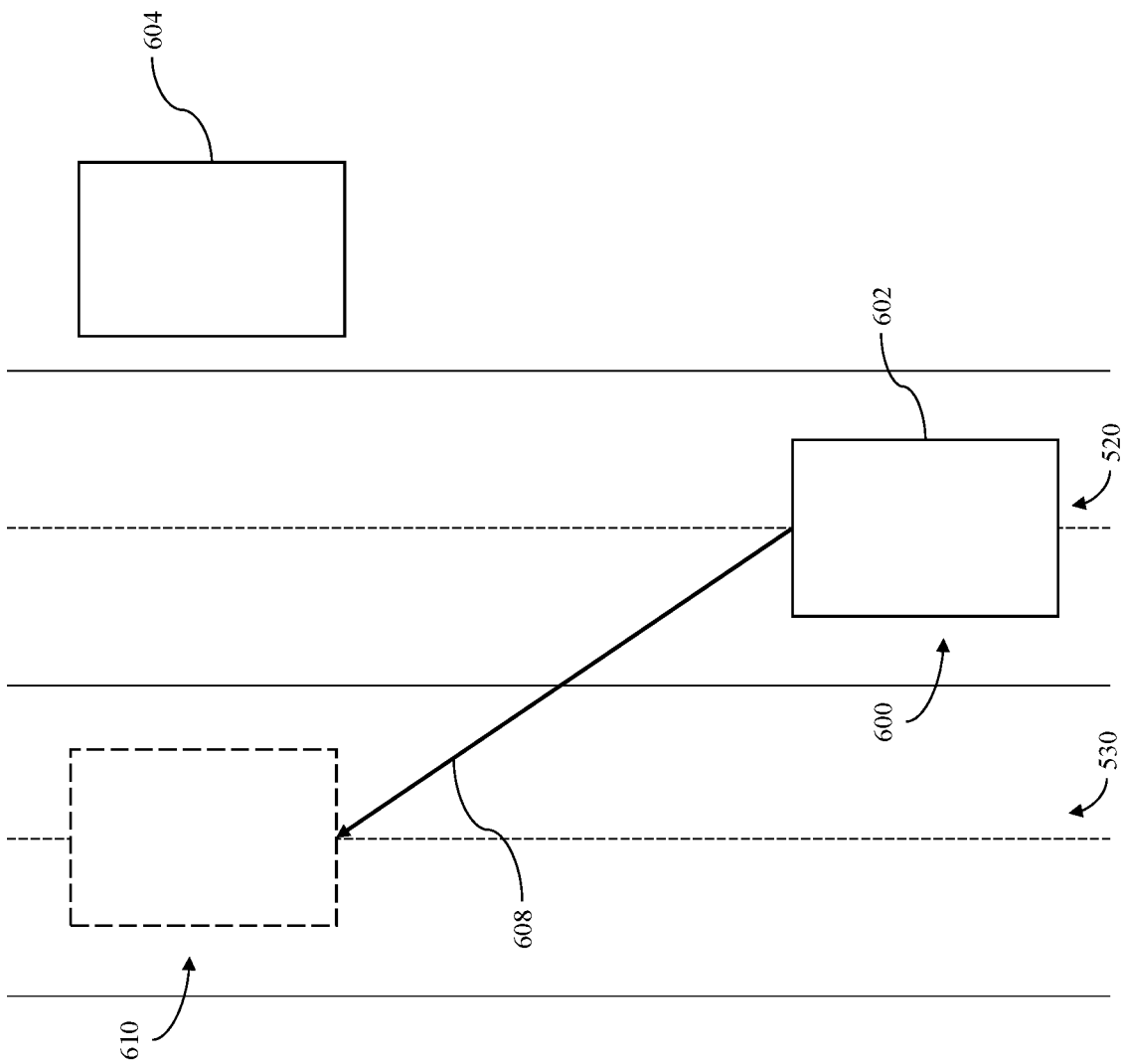

FIGS. 5-6 depict an exemplary sequence of scenarios illustrating the courtesy avoidance process 300 of FIG. 3 in concert with the object monitoring process 400 of FIG. 4 in accordance with one or more implementations. FIG. 5 depicts an initial state 500 of a vehicle 502 (e.g., vehicle 10) traveling along a route within a preferred (or highest priority) lane 520 while being operated in an autonomous cruise control mode or other Level Two autonomous operating mode that attempts to maintain the vehicle 502 substantially centered within the current lane 520 of travel along the lane centerline at a user-defined velocity, subject to other user-defined or user-configurable constraints (e.g., separation distances from other vehicles and the like). At the initial state 500, the sensing devices 40 onboard the vehicle 10, 502 capture or otherwise obtain sensor data associated with a stationary object 504 that is outside of the current lane 520 of travel. The sensor fusion system 74 associated with the vehicle 10, 502 detects the presence of the stationary object 504 (e.g., at 302) and determines an estimated location associated with the stationary object 504 (e.g., at 304), for example, by using image data, radar data and/or the like to calculate or otherwise determine the distance and orientation (represented by vector 506) from the current vehicle position to the observed position of the stationary object 504 to derive an estimated location of the stationary object 504 based on the location of the vehicle 10, 502 (e.g., by calculating estimated GPS coordinates of the stationary object 504 based on the GPS coordinates of the vehicle 10, 502 using the vector 506). Additionally, the sensor fusion system 74 associated with the vehicle 10, 502 may classify or otherwise assign an object type to the stationary object 504 based on the sensor data (e.g., at 306) and then upload or otherwise transmit the sensor data associated with the detected stationary object 504 to the remote server (e.g., at 308) for further processing and/or analysis.

Based on the current lane 520 being the preferred or highest priority lane of travel and the detected stationary object 504 being outside of the current lane 520 and not interfering with the path of the vehicle 10, 502 by virtue of the detected stationary object 504 having zero velocity or risk of encroaching into lane 520, the motion planning module of the guidance system 78 of the vehicle 502 determines a corresponding motion plan resulting in a planned trajectory 508 that maintains the vehicle 10, 502 within the current lane 520 of travel and reaching a future state 510 where the vehicle 10, 502 passes the detected stationary object 504 while maintaining its position in the same lane 520. In other words, the motion planning module of the guidance system 78 of the vehicle 502 does not respond to the detected stationary object 504 based on captured sensor data. It should be noted that at the future state 510, the vehicle 10, 502 may repeat the steps of detecting the stationary object 504 from the updated position of the vehicle 10, 502 at the future state, determining an estimated location of the stationary object 504 relative to the updated position of the vehicle 10, 502 at the future state, classifying the stationary object 504 based on sensor data obtained from the updated position of the vehicle 10, 502 at the future state, and uploading the corresponding set of detected object sensor data to the remote system. In this regard, an individual vehicle 10, 502 may capture multiple different sets or time slices of sensor data for a stationary object 504 at different points in time from different vehicle locations, which, in turn, may be utilized to improve the confidence associated with the estimated location of the stationary object 504, the object type classification assigned to the stationary object 504 and/or the like.

FIG. 6 depicts the courtesy avoidance process 300 in connection with a different vehicle 602 traveling along the same route as the vehicle 502 within the preferred (or highest priority) lane 520 while being operated in an autonomous cruise control mode after the remote system implementing the object monitoring process 400 of FIG. 4 has updated the lane preference information (e.g., at 410) for the subset of mapping information corresponding to the region that encompasses or is otherwise in the vicinity of the detected stationary object 504. In this regard, FIG. 6 depicts a scenario where, based at least in part on the sensor data corresponding to the detected stationary object 504 received from the preceding vehicle 502 (e.g., at 402), the remote system has determined the applicable avoidance criteria for the detected stationary object 504 have been satisfied (e.g., at 408). In response to determining the avoidance criteria with respect to the detected stationary object 504 have been satisfied, the remote system marks, tags or otherwise designates the left lane 530 further from the stationary object 504 as the preferred or highest priority lane in the vicinity of the estimated location of the detected stationary object 504 while marking, tagging, or otherwise designating the right lane 520 that is closest to (or adjacent to) the stationary object 504 as the non-preferred or lowest priority lane in the vicinity of the estimated location of the detected stationary object 504. The updated lane preference designations for the portion of the road may extend from an initial location in advance of the detected stationary object 504 (e.g., corresponding to the depicted initial state 600 of the vehicle 602 or further in advance of the estimated location of the detected stationary object 504) through a subsequent location along the road on the opposing side of (or past) the estimated location of the stationary object 604.

At the initial state 600, in response to receiving the updated lane preference information from the remote system (e.g., at 310), the autonomous cruise control mode supported by the guidance system 78 automatically initiates a lane change to move the vehicle 10, 602 from the temporarily non-preferred or lowest priority lane 520 to the temporarily preferred or highest priority lane 530 (subject to the presence of traffic that may inhibit a lane change). In this regard, the motion planning module of the guidance system 78 of the vehicle 10, 602 determines a corresponding motion plan to automatically change lanes, resulting in a planned trajectory 608 provided to the vehicle control system to autonomously operate the actuators 30 in accordance with the planned trajectory 608 to alter the lateral position of the vehicle 10, 502 from the initial position in the lane 520 adjacent to the detected stationary object 504 to an updated (or future) lateral position in the preferred or higher priority lane 530 while passing the detected stationary object 504. In this manner, by virtue of the knowledge of the presence of the stationary object 504 derived from preceding vehicles 502 that have previously encountered and traveled past the stationary object 504, the remote system updates lane preference information so that one or more subsequent vehicles 602 autonomously and automatically changes lanes to move to another lane 530 of travel that is further from the stationary object 504, thereby increasing the buffer distance between a subsequent vehicle 602 and the stationary object 504 (e.g., the lateral distance at state 610 when the vehicle 602 passes the estimated longitudinal location of the stationary object 504).

As a result, of the courtesy avoidance process 300 and the object monitoring process 400, an autonomous cruise control mode or other autonomous operating mode implemented by subsequent vehicles 602 may mimic cautious or courteous driving behavior that is likely to be performed by a human driver encountering the stationary object 504, thereby improving the user experience relative to maintaining travel in a lane nearest (or adjacent to) a stationary object 504, such as an emergency vehicle, a disabled vehicle or the like. By changing lanes in a precautionary manner when a lane change would not otherwise be dictated by the captured sensor data or the presence of a stationary object, unnecessary or undesirable manual intervention can be preemptively avoided.

While at least one exemplary aspect has been presented in the foregoing detailed description, it should be appreciated that a vast number of variations exist. It should also be appreciated that the exemplary aspect or exemplary aspects are only examples, and are not intended to limit the scope, applicability, or configuration of the disclosure in any way. Rather, the foregoing detailed description will provide those skilled in the art with a convenient road map for implementing the exemplary aspect or exemplary aspects. It should be understood that various changes can be made in the function and arrangement of elements without departing from the scope of the disclosure as set forth in the appended claims and the legal equivalents thereof.

What is claimed is:

1. At least one non-transitory computer-readable medium comprising executable instructions that, when executed by at least one processor, cause the at least one processor to:
   identify a stationary object outside a first lane of travel based at least in part on one or more sets of sensor data captured by one or more sensing devices onboard one or more vehicles;
   identify an estimated location of the stationary object based at least in part on the one or more sets of sensor data and one or more locations of the one or more vehicles;
   determine whether one or more avoidance criteria associated with the stationary object are satisfied;
   update a lane preference associated with at least a portion of the first lane of travel corresponding to the estimated location for the stationary object by designating the portion of the first lane of travel corresponding to the estimated location for the stationary object as a non-preferred lane and designating the portion of a second lane of travel corresponding to the estimated location for the stationary object as a preferred lane to automatically initiate a lane change from the first lane of travel to the second lane of travel in advance of estimated location to increase a buffer distance with respect to the stationary object when the one or more avoidance criteria are satisfied, resulting in an updated lane preference associated with the at least the portion of the first lane of travel; and
   provide the updated lane preference associated with the at least the portion of the first lane of travel to a vehicle over a network, wherein one or more actuators onboard the vehicle are autonomously operated to change lanes from the first lane of travel to the second lane of travel in advance of the estimated location based at least in part on the updated lane preference.

2. The at least one non-transitory computer-readable medium of claim 1, wherein:
   the one or more avoidance criteria include a minimum threshold number of observations; and
   the executable instructions cause the at least one processor to:
      determine whether a number of observations of the stationary object by the one or more vehicles is greater than or equal to the minimum threshold number of observations; and update the lane preference after determining the number of observations is greater than or equal to the minimum threshold number of observations.

3. The at least one non-transitory computer-readable medium of claim 2, wherein:

the one or more avoidance criteria include an observation window of time for the minimum threshold number of observations; and the executable instructions cause the at least one processor to:

determine whether the number of observations of the stationary object by the one or more vehicles is greater than or equal to the minimum threshold number of observations within the observation window of time; and update the lane preference after determining the number of observations within the observation window of time is greater than or equal to the minimum threshold number of observations.

4. The at least one non-transitory computer-readable medium of claim 3, wherein the executable instructions cause the at least one processor to determine the observation window of time based at least in part on the estimated location of the stationary object.

5. The at least one non-transitory computer-readable medium of claim 2, wherein the executable instructions cause the at least one processor to determine the minimum threshold number of observations based at least in part on the estimated location of the stationary object.

6. The at least one non-transitory computer-readable medium of claim 1, wherein the executable instructions cause the at least one processor to:

identify an object type associated with the stationary object; and determine the one or more avoidance criteria based at least in part on the object type.

7. The at least one non-transitory computer-readable medium of claim 1, wherein the executable instructions cause the at least one processor to:

identify an object type associated with the stationary object; and determine a distance for the portion of the first lane of travel based at least in part on the object type.

8. The at least one non-transitory computer-readable medium of claim 1, wherein the executable instructions cause the at least one processor to:

determine whether a monitoring period of time has elapsed since a most recent observation of the stationary object after updating the lane preference; and in response to an absence of a recurring observation within the monitoring period of time, reverting the lane preference associated with the at least the portion of the first lane of travel from the updated lane preference to an original lane preference associated with the portion of the first lane of travel.

9. A method of controlling a vehicle in an autonomous operating mode, the method comprising:

identifying, by a controller associated with the vehicle, a stationary object outside a current lane of travel based at least in part on sensor data from one or more sensing devices onboard the vehicle;

determining, by the controller, an estimated location for the stationary object based at least in part on the sensor data and a location of the vehicle;

providing, by the controller, the estimated location for the stationary object to a remote system, wherein the remote system is configured to update a lane preference associated with at least a portion of the current lane of travel corresponding to the estimated location for the stationary object by designating the portion of the current lane of travel corresponding to the estimated location for the stationary object as a non-preferred lane and designating the portion of a second lane of travel corresponding to the estimated location for the stationary object as a preferred lane to automatically initiate a lane change from the current lane of travel to the second lane of travel in advance of the estimated location to increase a buffer distance with respect to the stationary object when the stationary object satisfies one or more avoidance criteria, resulting in an updated lane preference associated with the at least the portion of the current lane of travel;

determining, by the controller, a trajectory for the vehicle to change lanes from the current lane of travel to the second lane of travel in advance of the estimated location based at least in part on the updated lane preference; and autonomously operating, by the controller, one or more actuators onboard the vehicle in accordance with the trajectory.

10. The method of claim 9, further comprising:

determining, by the controller, an object type associated with the stationary object based at least in part on the sensor data; and providing, by the controller, the object type for the stationary object to the remote system, wherein the remote system is configured to update the lane preference associated with at least the portion of the current lane of travel in a manner that is influenced by the object type.

11. The method of claim 9, wherein the remote system is configured to update the lane preference when a number of observations associated with the stationary object is greater than a threshold.

12. At least one non-transitory computer-readable medium comprising executable instructions that, when executed by at least one processor, cause the at least one processor to perform the method of claim 9.

13. A vehicle system comprising one or more vehicles coupled to a network to obtain lane preference information for a road, wherein the one or more vehicles comprise:

a sensor to provide sensor data for a stationary object external to the respective vehicle outside of a first lane of the road;

a navigation system to provide location data for the respective vehicle contemporaneous to the sensor data;

a memory comprising computer readable instructions; and a processing device for executing the computer readable instructions, the computer readable instructions controlling the processing device to perform operations comprising:

determining an estimated location for the stationary object based at least in part on the sensor data and the location data for the respective vehicle;

providing the estimated location for the stationary object, wherein the lane preference information associated with at least a portion of the road corresponding to the estimated location for the stationary object is updated by designating the portion of a first lane of travel corresponding to the estimated location for the stationary object as a non-preferred lane and designating the portion of a second lane of travel corresponding to the estimated location for the stationary object as a preferred lane to automatically initiate a lane change from the first lane of travel to the second lane of travel in advance of the estimated location to increase a buffer distance with respect to the stationary object when the stationary object satisfies one or more avoidance criteria, resulting in updated lane preference information associated with the at least the portion of the road;

determining a trajectory for the respective vehicle to change lanes from the first lane of travel to the second lane of travel in advance of the estimated location based at least in part on the updated lane preference information; and autonomously operating one or more actuators onboard the respective vehicle in accordance with the trajectory.

14. The vehicle system of claim 13, wherein:

the one or more avoidance criteria include a minimum threshold number of observations; and the lane preference information is updated after determining a number of observations of the stationary object by the one or more vehicles is greater than or equal to the minimum threshold number of observations.

15. The vehicle system of claim 14, wherein:

the one or more avoidance criteria include an observation window of time for the minimum threshold number of observations; and the lane preference information is updated after determining the number of observations within the observation window of time is greater than or equal to the minimum threshold number of observations.

16. The vehicle system of claim 15, wherein the observation window of time is determined based at least in part on the estimated location of the stationary object.

17. The vehicle system of claim 14, wherein the minimum threshold number of observations is determined based at least in part on the estimated location of the stationary object.

18. The vehicle system of claim 13, wherein the lane preference information is automatically reverted in response to an absence of a recurring observation within a monitoring period of time that has elapsed since a most recent observation of the stationary object after updating the lane preference information.

19. The at least one non-transitory computer-readable medium of claim 1, wherein the stationary object comprises an emergency vehicle of an other vehicle stopped on a shoulder of a road.

20. The at least one non-transitory computer-readable medium of claim 19, wherein the updated lane preference is configurable to cause an autonomous cruise control mode of the vehicle to autonomously operate the one or more actuators onboard the vehicle to change lanes in a manner that mimics a human driver encountering the stationary object.

\* \* \* \* \*